United States Patent
Rans et al.

(10) Patent No.: US 9,155,241 B2
(45) Date of Patent: Oct. 13, 2015

(54) INTEGRAL SEED METER DRIVE MOTOR

(75) Inventors: Monte J. Rans, Hesston, KS (US); Robert A. Matousek, Valley Center, KS (US); Russell Secrest, Newton, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 14/111,780

(22) PCT Filed: Apr. 16, 2012

(86) PCT No.: PCT/US2012/033730
§ 371 (c)(1),
(2), (4) Date: Oct. 15, 2013

(87) PCT Pub. No.: WO2012/142558
PCT Pub. Date: Oct. 18, 2012

(65) Prior Publication Data
US 2014/0312055 A1    Oct. 23, 2014

(51) Int. Cl.
*A01C 7/04* (2006.01)
*A01C 19/02* (2006.01)

(52) U.S. Cl.
CPC . *A01C 7/04* (2013.01); *A01C 7/046* (2013.01); *A01C 19/02* (2013.01)

(58) Field of Classification Search
CPC .............. A01C 7/00; A01C 7/02; A01C 7/04; A01C 7/044; A01C 7/046; A01C 19/00; A01C 19/02
USPC .................. 111/183–185, 177, 170
See application file for complete search history.

(56) References Cited

U.S. PATENT DOCUMENTS

| 3,858,115 | A | * | 12/1974 | Griffin, Jr. ..................... 324/137 |
| 6,752,095 | B1 | | 6/2004 | Rylander et al. |
| 2012/0048161 | A1 | | 3/2012 | Shoup |

FOREIGN PATENT DOCUMENTS

| EP | 1031266 A1 | 8/2000 |
| EP | 1402765 A1 | 3/2004 |

OTHER PUBLICATIONS

International Application Search Report for International Application No. PCT/US2012/033730 dated Jul. 20, 2012.

* cited by examiner

*Primary Examiner* — Christopher J Novosad

(57) ABSTRACT

A metering device (24) for an agricultural planter (10) has a metering chamber (80) with a seed discharge (98) area and a metering disc (66) rotatable within the metering chamber (80). The metering disc (66) has plurality of seed pockets (68) for carrying seeds on the metering disc (66), the seed pockets (68) being disposed at mutually spaced locations about the metering disc (66). The metering disc also has a magnetic drive ring (136) in the outer periphery of the metering disc (66). The metering device also has a stator positioned adjacent the metering disc. The stator (132) interacts with the magnetic drive ring (136) to rotate the metering disc (66) within the metering chamber (80) such that the seed pockets (68) move successively in proximity to the discharge area (98) during rotation of the metering disc (66).

2 Claims, 6 Drawing Sheets

INTEGRAL SEED METER DRIVE MOTOR

BACKGROUND OF THE INVENTION

1. Field of Invention

This invention relates to agricultural planting equipment and, more particularly, to a metering device drive motor for dispensing seeds and/or fertilizer.

2. Description of Related Art

As is well-known, a farmer engaged in mechanized planting of seeds utilizes a planting machine pulled behind a tractor. One form of planting machine commonly in use includes at least one rotating drum which holds the supply of seeds to be planted and has means for delivering the seeds to one or more chutes which conduct the seeds to the desired planting rows on the ground at various depths and spacings. The seeds are singulated and metered by a seed metering disc with pockets, holes or combinations thereof, and using either a vacuum or positive air pressure. Seed meters require a drive source to rotate the seed disc in order to singulate seed for planting.

Current technology typically uses a ground drive assembly that drives all meters simultaneously through a chain drive mechanism connected to a drive wheel that defines the rate of speed of forward motion of the planter. This mechanical drive assembly requires a multitude of rotating shaves, bearings, support brackets, sprockets, chains and idlers. This approach requires the implement to be stopped while one or more chains are moved and positioned about various sized sprockets or gears.

Other agricultural seed metering systems have been developed which allow the seed metering rate to be adjusted on the go while crossing a field. Such systems typically omit mechanical ground drive assemblies and instead rely on electronics to control hydraulic systems for accurate metering. To adjust the metering rate, the electronics control the hydraulic system to adjust the hydraulic oil flow sent to the hydraulic motor to adjust the rate at which the rotatable metering member is rotated.

Although such systems enable the metering rate to be adjusted on the go, such electronic metering systems are extremely expensive to implement and are difficult to diagnose and repair when damaged. Moreover, as compared to ground driven mechanical metering systems, such electronic metering systems require an additional hydraulic circuit to drive the hydraulic motors connected to the rotatable metering members. This additional hydraulic circuit increases hydraulic requirements of the work vehicle or tractor and when connected to open center hydraulic systems, can cause overheating problems. This drive assembly also requires a multitude of rotating shaves, bearings, support brackets, sprockets, chains and idlers.

Thus, there is a continuing need for an agricultural seed metering system that allows the operator to vary the speed of each metering unit individually, is adjustable on the move, and reduces the parts and space required for rotational power requirements.

OVERVIEW OF THE INVENTION

In one embodiment, the invention is directed to a metering device for an agricultural planter. The metering device has a metering chamber with a seed discharge area and a metering disc rotatable within the metering chamber. The metering disc has a plurality of seed pockets for carrying seeds on the metering disc, the seed pockets being disposed at mutually spaced locations about the metering disc. The metering disc also has a magnetic drive ring in the outer periphery of the metering disc. The metering device also has a stator positioned adjacent the metering disc. The stator interacts with the magnetic drive ring to rotate the metering disc within the metering chamber such that the seed pockets move successively in proximity to the discharge area during rotation of the metering disc.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DESCRIPTION OF EXAMPLE EMBODIMENTS

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments. References hereinafter made to certain directions, such as, for example, "front", "rear", "left" and "right", are made as viewed from the side of the planter.

Figure 1:
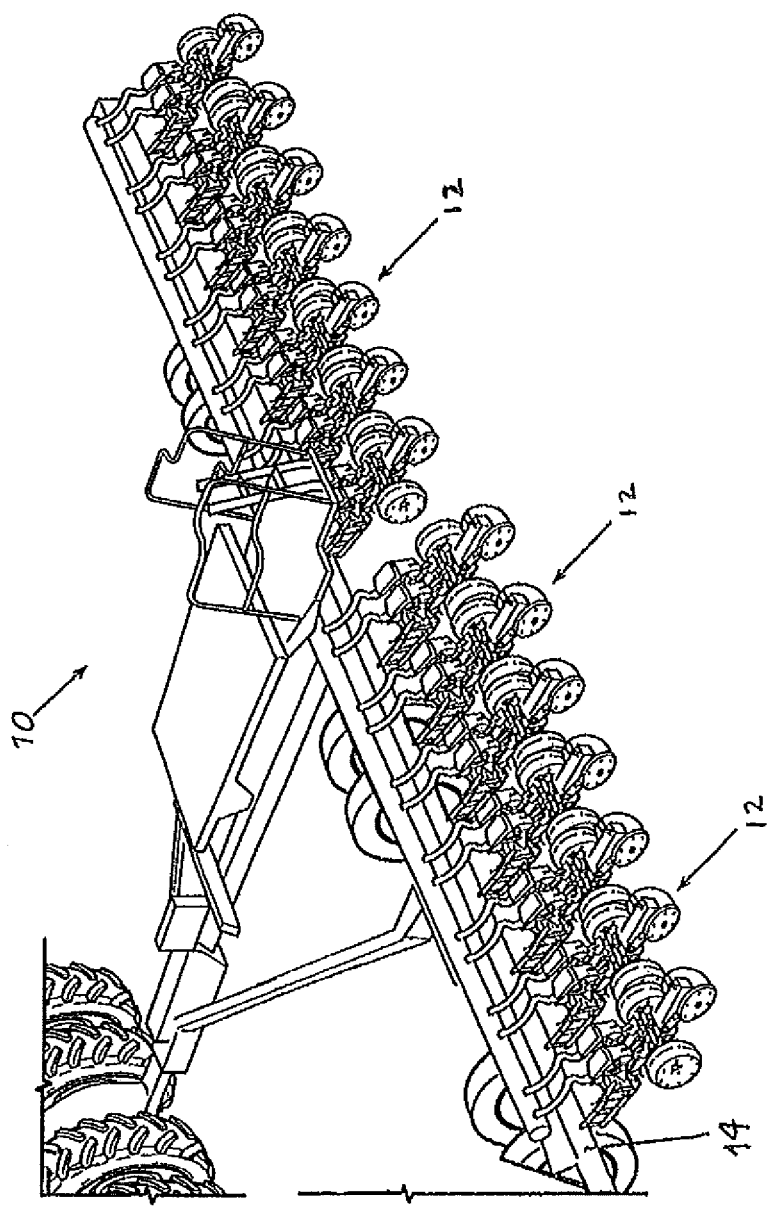
FIG. 1 is a left perspective view of a planter employing multiple planter units incorporating the principles of the present invention.
Figure 2:
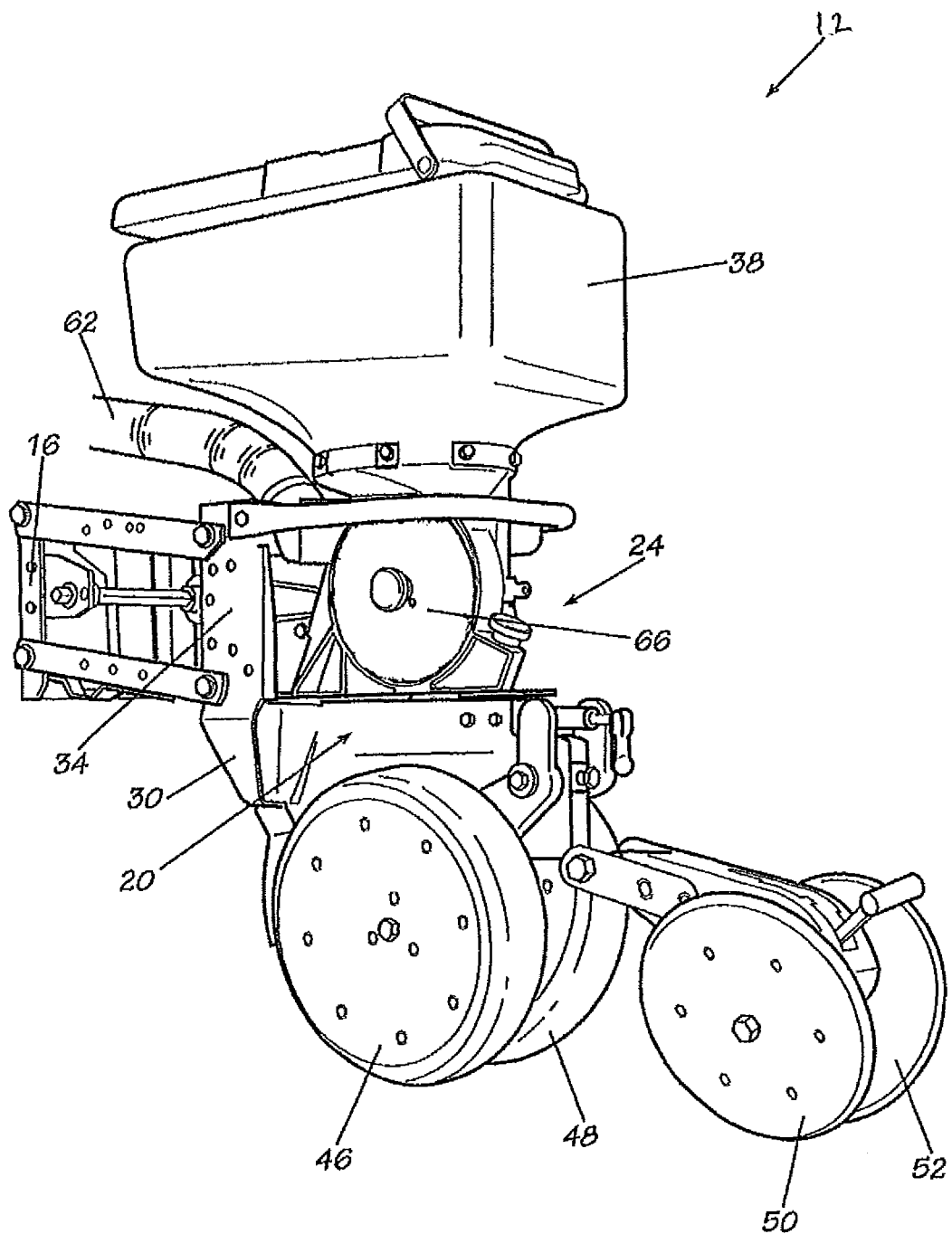
FIG. 2 is a front perspective view of a single row planter unit according an embodiment of the invention.
Figure 3:
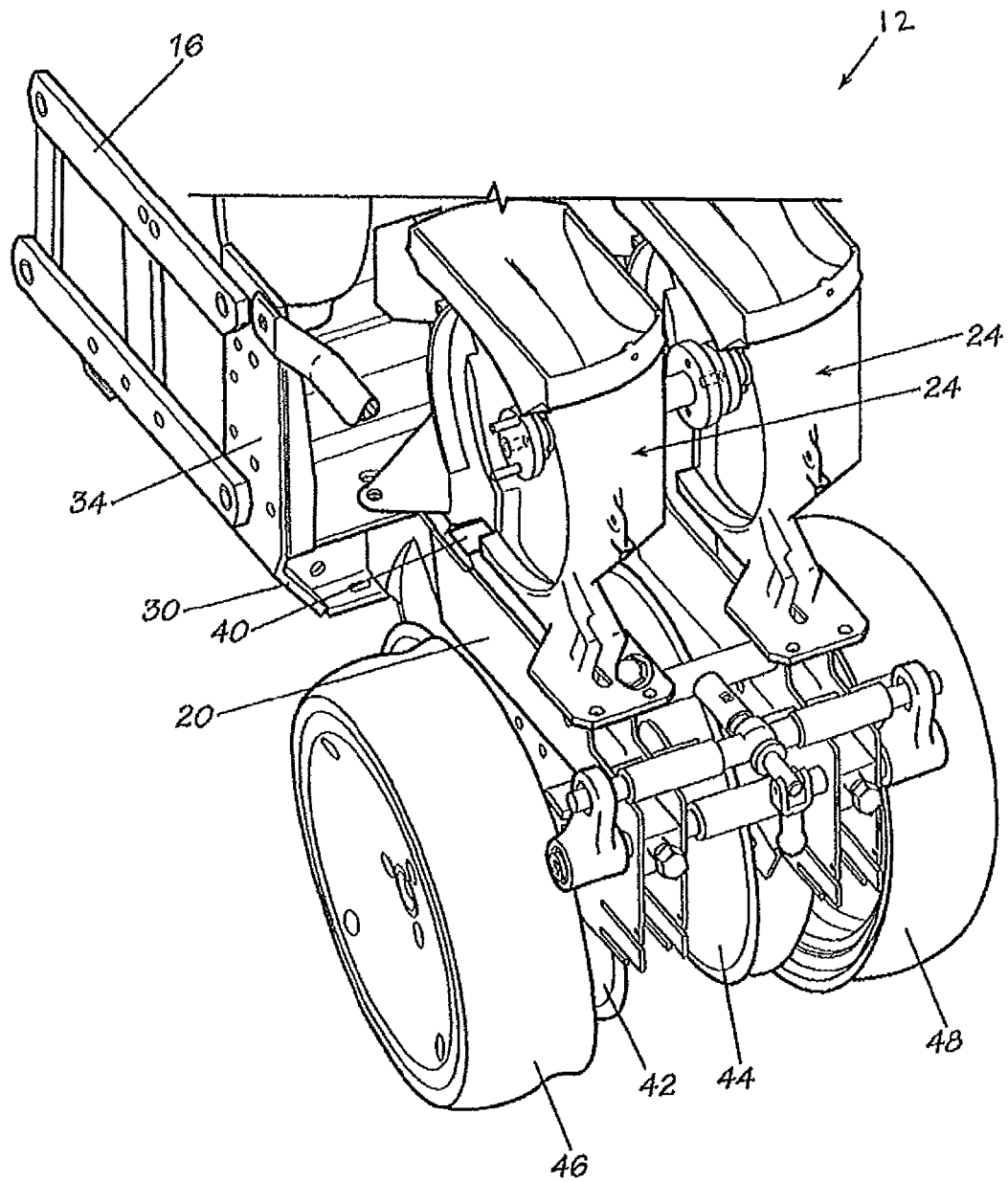
FIG. 3 is a rear view from above of showing a fragmentary view of a dual row planter unit according an embodiment of the invention.

FIG. 1 illustrates a planter 10 having a plurality of planting units 12 attached to a tool bar 14 or other frame member of the machine. As well understood by those skilled in the art, planter 10 may be adapted for mounting on the three point hitch of a tractor or may comprise a pull-type implement with its own set of transport wheels. Each planting unit 12 includes some suitable means for attaching the unit to tool bar 14. One embodiment of such attachment means is illustrated in FIGS. 2 and 3 and comprises a four-bar linkage 16 and a pair of U-bolts (not shown) for fastening the linkage 16 to the tool bar 14. However, other means to attach the planting unit 12 to the tool bar 14 may be used without departing from the scope of the invention. Each planting unit 12 further broadly comprises a fore-and-aft lower frame 20 attached to and projecting rearwardly from linkage 16, the frame 20 having a number of components mounted thereon as hereinafter explained.

As is known in the art, each planting unit 12 has one or more seed meters 24 used to singulate seeds for planting by planter 10. For example, a planting unit 12 may be a single row planting unit or a dual row planting unit. A single row planting unit 12 with a single seed meter 24 is shown in FIG.

2. A dual row planting unit 12 includes the lower frame 20 and a pair of singulating seed meters 24 indexed together as best shown in FIG. 3. The meters 24 of a twin row planting unit 12 are mechanically indexed together or may be controlled separately with electronics and sensors. Therefore, each planting unit 12 may plant one or more furrows or lines of seed. While the described embodiment is a seed meter, one skilled in the art will understand that other agricultural materials, such as fertilizer may be metered and dispensed with the planting unit 12 without departing from the scope of the invention. The lower frame 20 of each planting unit 12 includes what is commonly referred to as a horse collar 30 for further securing the planting unit 12 to the tool bar 14 and for protecting the meters 24. Each horse collar 30 includes upward extending and opposite facing portions 34 that are sufficiently laterally spaced apart from one another depending on whether it is part of a single row or a dual row planting unit 12.

For each seed meter 24, the lower frame 20 of the planting unit 12 carries a generally upright dispensing tube 40 that is best seen in FIG. 3 and is adapted for receiving inputs such as seeds from one of the meters 24 disposed above dispensing tube 40 on frame 20. The meter 24 receives seeds from a source of supply, such as a seed box or hopper 38 also mounted on lower frame 20 above the meter 24. Seeds that are received by the meter 24 from the hopper 38 are singulated and dropped through dispensing tube 40 for deposit into the ground as planter 10 advances.

A suitable furrow opener may also be carried by frame 20 for opening a furrow in the soil for receiving seeds dropped through dispensing tube 40. The furrow opener may take a variety of different forms. For example, the furrow opener may take the form of a double-disc opener having a pair of downwardly and slightly forwardly converging discs 42, 44 rotatably mounted on lower frame 20. Dispensing tube 40 projects downwardly between discs 42, 44 and has a lower discharge end facing generally rearwardly and downwardly to discharge the seeds into the furrow.

A pair of ground-engaging gauge wheels 46 and 48 is disposed on opposite sides and is rotatably mounted on frame 20 to provide support for frame 20 and to limit the depth of penetration of the furrow opener into the ground. As frame 20 can swing up and down relative to tool bar 14 via the four-bar linkage 16, the downward movement is limited by gauge wheels 46, 48 as they roll along the ground during operation. In the illustrated embodiment, a pair of closing wheels 50, 52 is attached to the rear of frame 20 and function in a known manner to close the seed furrow after seeds have been deposited therein by dispensing tube 40. The vertical position of gauge wheels 46, 48 relative to frame 20 and furrow discs 42, 44 can be adjusted.

Figure 4:
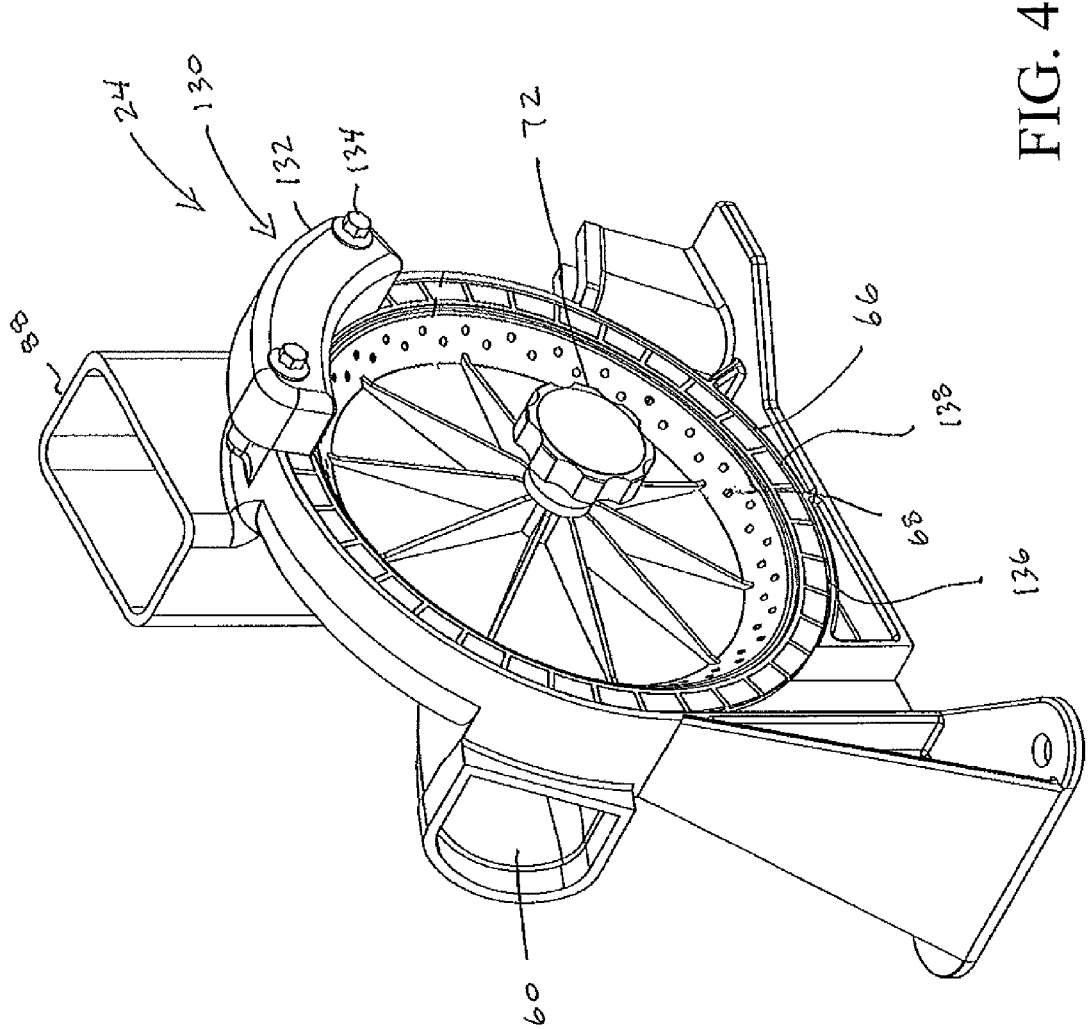
FIG. 4 is a partial view of a planter unit showing a metering disc according an embodiment of the invention.
Figure 5:
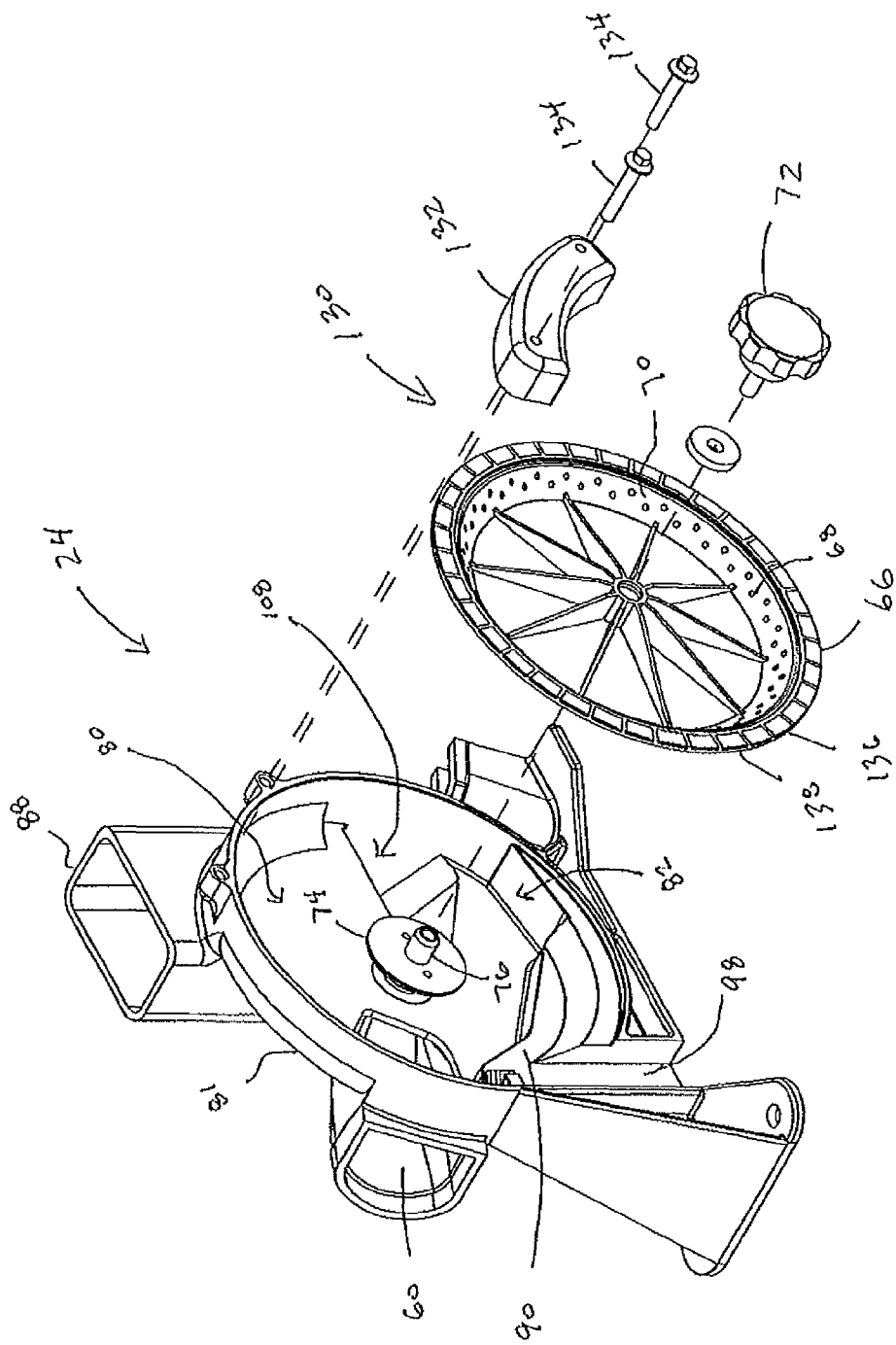
FIG. 5 is an exploded view of the planter unit of FIG. 4.

Turning now to FIGS. 4 and 5, desirably the meters 24 are pneumatic such that low pressure air flow enters through air inlet 60 in the meter 24. Air flow for all the meters 24 of a planter 12 may be generated by a single variable speed hydraulically powered fan centrally positioned on the planter 10, or alternatively, an individual fan dedicated to and preferably coupled to each meter 24. FIG. 2 best illustrates air lines 62 for providing air to the air inlet 60 of the meters 24 from a central fan.

Each meter 24 includes a rotating metering disc 66 that has a plurality of input pockets such as seed pockets 68 for retaining one or more seeds. The seed pockets 68 are positioned on the inside surface of the metering disc 66 when the metering disc 66 is positioned in the meter 24. In the illustrated embodiment, the seed pockets 68 are located in an internal angled ledge 70 of the metering disc 66, however one skilled in the art will understand that the metering disc 66 may be formed with other shapes to accommodate the seed pockets 68. The seed pockets 68 may be shaped such that they can received a variety of seed sizes and shapes such that the disc 66 may be used for any type of crop or a different metering disc 66 may be used for each type of crop. A retaining knob 72 attaches the metering disc 66 to a hub 74 of an axle 76. As best shown in FIG. 4, the hub 74 is coupled to the axle 76 corresponding with the axis of rotation of the metering disc 66 rotating in the meter 24. Preferably the pair of meters 24 of a dual row planting unit 12 is axially aligned with one another so that a single elongated shaft or a combination of axially aligned shafts may extend between the two meters 24 as best shown in FIG. 3. However, in the event that the two meters 24 are not positioned side by side in axial alignment, for example one could be positioned slightly forward of the other, then separate axles 76 are required. In such case, the two axles 76 having axes of rotations that are in parallel misalignment with one another may be driven together with a sprocket and a belt or chain or some other mechanism. The metering discs 66 of a pair of meters 24 of a dual row planting unit 12 are indexed relative to one another such that the seed pockets 68 of one metering disc 66 corresponds with the seed pockets 68 of the other metering disc 66 as both metering discs 66 rotate in their respective meters 24. Alternatively, the two metering discs 66 could be indexed relative to one another such that the seeds in adjacent rows are offset from one another.

Figure 6:
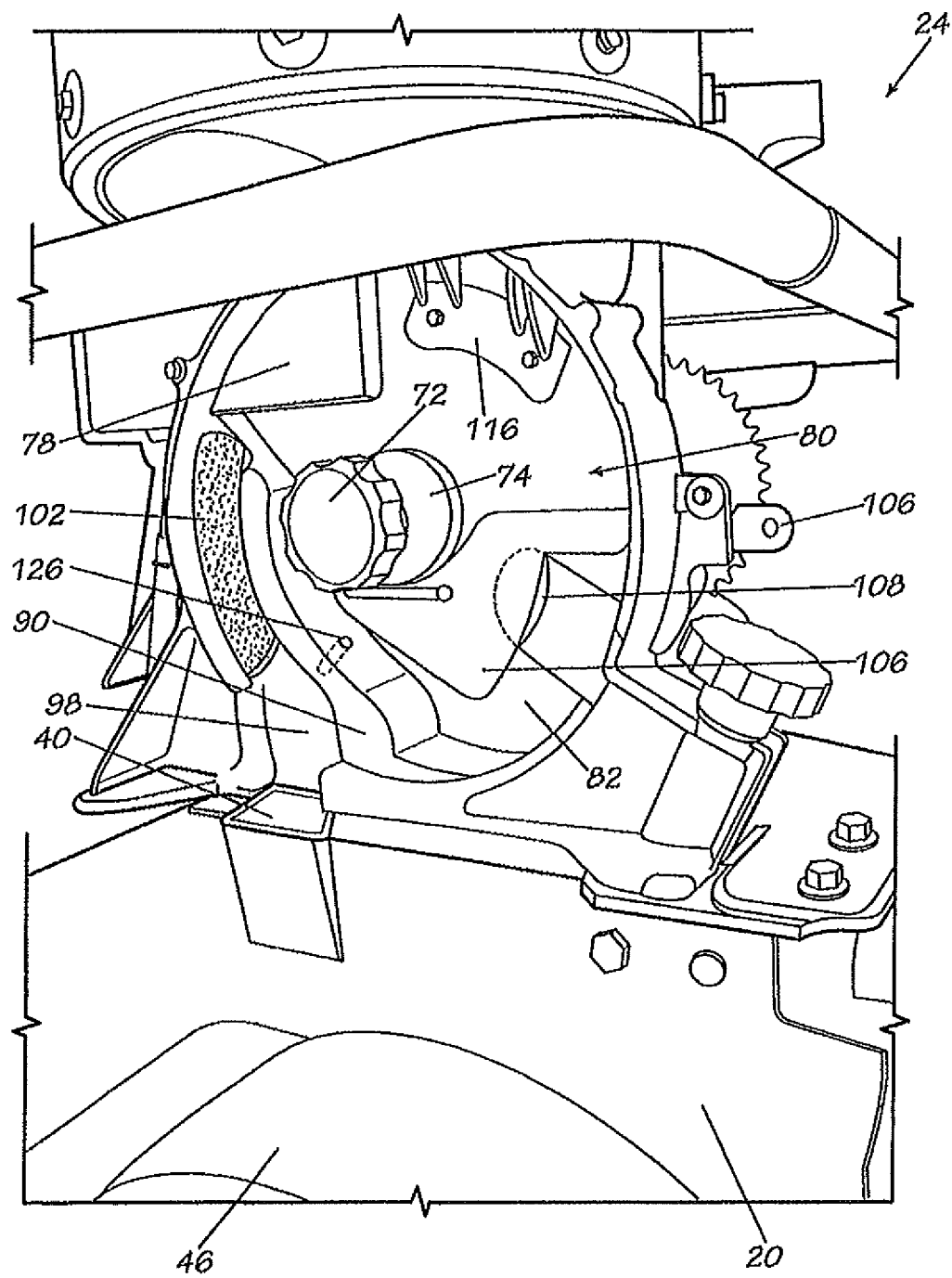
FIG. 6 is a right side perspective view of a planter unit with the metering disc removed.

The positive air flow into the meter 24 through air inlet 60 creates a pressurized metering chamber 80 between the inside of the metering disc 66 and a housing 81 of the meter 24. A portion of the chamber 80 defines a seed sump 82 for receiving and collecting a portion of the seeds from the hopper 38 through feed chute 88. As best seen in FIG. 6, an air cutoff shelf 90 extends through the chamber 80 to the periphery of the metering disc 66 above the dispensing tube 40. The cutoff shelf 90 has a radial thickness sufficient to exclude most of the positive airflow from passing between the outwardly extending surface of the cutoff shelf 90 and the inner surface of the metering disc 66. Shims may be used between the metering disc 66 and hub 74 so that the metering disc 66 is permitted to rotate and that only a nominal amount of drag exists between the inner surface of the metering disc 66 and the outwardly extending exterior surface of the cutoff shelf 90. The number of shims used can determine the amount of air allowed to pass over the cutoff shelf 90. In front of the cutoff shelf 90 is a discharge area 98 where the seeds from the seed pockets 68 of the metering disc 66 are dropped into the dispensing tube 40. Also positioned in front of the cutoff shelf 90 is an air cutoff brush 102. Both the discharge area 98 and the cutoff brush 102 correspond with the seed pockets 68 along the periphery of the metering disc 66 as they rotate.

A sliding seed gate 106 controls the seed level in the seed sump 82 of the meter 24 for precise metering of a wide range of seed sizes from the hopper 38 through a variably sized opening 108 into the chamber 80. As the metering disc 66 rotates in a counter-clockwise manner, seeds are collected in the seed pockets 68. The seeds are held in each seed pocket 68 by the positive air pressure pushing on the seeds. However, a vacuum may instead be used to retain the seed in its pocket 68. In one or more embodiments, the seed pockets 68 also at least partially define an opening 112 extending from each of the seed pockets 68 to the opposite side of the metering disc 66.

When a seed advances around the meter 24 in a seed pocket 68, excess seeds are removed from each seed pocket 68 when the seed pocket 68 with excess seeds reaches a tickler brush 116. As the seed continues to advance around the meter 24, the air cutoff brush 102 gently shuts off the air to the seed in each of the seed pockets 68 corresponding with the cutoff brush 102 and holds each seed in place in its seed pocket 68 until reaching the bottom of the metering disc rotation and is released down the dispensing tube 40.

Although the air cutoff shelf 90 eliminates air flow to the seed pockets 68 with seeds as they rotate in front of the cutoff shelf 90, a flow of directed air across the metering disc 66 at the dispensing point may be used to assist the seed falling out of the seed pocket 68 and into the discharge area 98 and into the dispensing tube 40. An air passage 126 may be positioned through the thickness of the cutoff shelf 90. The passage 126 is preferably formed into the meter's casting in a way that allows a small stream of air from the pressurized side of the chamber 80 to blow across at the seed release point in the discharge area 98 above the dispensing tube 40. As best shown in FIG. 6, an air inlet 128 of the passage 126 is positioned on one side of the cutoff shelf 90 adjacent the seed sump 82 and an air outlet 130 of the passage 126 is positioned on the opposite side adjacent with and communicating with the discharge area 98. A tube may be positioned in the passage 126.

Alternatively, instead of utilizing the air from the metering chamber 80, a different air source could be used to provide the directed air at the release point through the passage 126 or through a different opening or air passage directed toward the release point. The alternative air source could be directly from the air lines 66 from the central fan before the air enters the metering chamber 80 of the meter 24 or a separate dedicated air source such as a dedicated fan could be utilized. If an independent air source is utilized, the air flow may be varied. The air flow could be adjusted independently of the air flow of central fan and air line system. For example, the air flow could be pulsed. The dedicated fan could be toggled between off and on to generate the pulsed air flow, or all or part of an obstruction could be intermittently placed in or over the passage 126 to prevent air from passing through the passage 126 from the pressurized metering chamber 80, and be timed to correspond with when the seed is to leave the seed pocket 68. The air flow could also be accelerate or decelerate the seed traveling through the discharge area 98 or the dispensing tube 40. In one embodiment, the periphery of the metering disc 66 could be part or all of the obstruction as it rotates over the passage 126. Thus, the exit velocity of the seed from the dispensing tube 40 could be matched with the forward speed of the planter 10.

A drive motor 130 causes the metering disc 66 to rotate on axle 72 to drop singulated seeds through the dispensing tube 40 as the planter 10 advances through the field. As best seen in FIGS. 4 and 5, the drive motor 130 includes a stationary stator 132 mounted adjacent the metering disc 66. Stator 132 may be mounted to the housing of the seed meter 24 using bolts 134 or any other suitable mounting means using sound engineering judgment. According to the invention, the metering disc 66 has a magnetic drive ring 136 in an outer portion thereof configured to interact with the stator 132 such that the metering disc 66 forms a rotor of the drive motor 130. In one embodiment, the drive ring 136 contains a plurality of permanent magnets 138 arranged around the periphery of the metering disc 66. Alternately, the drive ring 136 may be a single magnet rail formed around the outer circumferential portion of the metering disc 66. The magnets 138 may be molded, glued, or otherwise attached directly to the metering disc 66 or may be attached to a magnet receiving base, which base is then mounted on the metering disc 66 using sound engineering judgment.

In one embodiment, the drive motor 130 operates as an inside out motor with the moving magnets 138 on the rotating metering disc 66 interacting with the multi pole fixed stator 132 carrying the field windings. In another embodiment, the drive motor 130 operates as an ironcore motor with the stationary stator 132 made of copper windings wrapped around iron laminations and a back iron configured to provide a path for the magnetic flux to circulate between the stator 132 and the magnetic drive ring 134. Accordingly, the drive motor 130 comprises the metering disc 66. The drive motor 130 allows the operator of the planter to vary the speed at which the metering disc 66 rotates by controlling the current through the stator 132. As each planting unit 12 on the planter 10 has its own drive motor 130, planting units 12 can be individually controlled. Desirably, the drive motor 130 permits the operator to reverse the direction of rotation of the metering disc 66 for self cleaning or planting non-traditional crops such as grass. As can be seen, by utilizing the metering disc 66 as part of the drive motor 130, fewer parts may be required to meet the rotational requirements of the seed meter 24.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. A metering device for an agricultural planter, the metering device comprising:
   a metering chamber having a seed discharge area;
   a metering disc rotatable within said metering chamber and having a plurality of seed pockets for carrying seeds on said metering disc, said seed pockets being disposed at mutually spaced locations about said metering disc, and a magnetic drive ring on said metering disc; and
   a stator positioned adjacent the metering disc, said stator interacting with the magnetic drive ring to rotate said metering disc within said metering chamber such that said seed pockets move successively in proximity to said discharge area during rotation of said metering disc, wherein the magnetic drive ring comprises a plurality of permanent magnets.

2. The metering device of claim 1 wherein the magnetic drive ring is in the outer periphery of the metering disc.

* * * * *